United States Patent
Yang et al.

(10) Patent No.: US 9,838,621 B2
(45) Date of Patent: Dec. 5, 2017

(54) METHOD AND SYSTEM FOR IMPLEMENTING H-BANDING CANCELLATION IN AN IMAGE SENSOR

(71) Applicant: OMNIVISION TECHNOLOGIES, INC., Santa Clara, CA (US)

(72) Inventors: Zheng Yang, San Jose, CA (US); Hiroaki Ebihara, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/147,741

(22) Filed: May 5, 2016

(65) Prior Publication Data
US 2017/0324910 A1    Nov. 9, 2017

(51) Int. Cl.
*H04N 5/341*    (2011.01)
*H04N 5/374*    (2011.01)

(52) U.S. Cl.
CPC ............. *H04N 5/341* (2013.01); *H04N 5/374* (2013.01)

(58) Field of Classification Search
CPC ............................... H04N 5/341; H04N 5/374
See application file for complete search history.

(56) References Cited

U.S. PATENT DOCUMENTS

| 6,844,896 B2 | 1/2005 | Henderson et al. | |
| 2009/0128676 A1* | 5/2009 | Tanaka | H04N 5/335 348/300 |
| 2009/0184236 A1* | 7/2009 | Kawaguchi | H04N 5/3742 250/208.1 |
| 2011/0025900 A1* | 2/2011 | Kondo | H04N 5/378 348/308 |
| 2012/0039548 A1* | 2/2012 | Wang | H03M 1/1009 382/312 |
| 2014/0022430 A1* | 1/2014 | Ueno | H04N 5/37455 348/308 |
| 2014/0374571 A1* | 12/2014 | Okamoto | H04N 5/378 250/208.1 |

* cited by examiner

*Primary Examiner* — Gevell Selby
(74) *Attorney, Agent, or Firm* — Christensen O'Connor Johnson Kindness PLLC

(57) ABSTRACT

A method for implementing H-Banding cancellation in an image sensor starts with a pixel array capturing image data. Pixel array includes a plurality of pixels to generate pixel data signals, respectively. ADC circuitry acquires the pixel data signals. ADC circuitry includes a comparator circuitry. In one embodiment, comparator circuitry 310 includes a plurality of comparators. Comparators included in comparator circuitry compare the pixel data signals, respectively, to a ramp signal received from a ramp generator to generate comparator output signals. Adjacent comparators output signals may be opposite in polarity. Other embodiments are described.

20 Claims, 6 Drawing Sheets

METHOD AND SYSTEM FOR IMPLEMENTING H-BANDING CANCELLATION IN AN IMAGE SENSOR

FIELD

An example of the present invention relates generally to image sensors. More specifically, examples of the present invention are related to methods and systems for implementing H-banding cancellation in column analog-to-digital conversion (ADC) circuitry of the readout circuitry in image sensors.

BACKGROUND

High speed image sensors have been widely used in many applications in different fields including the automotive field, the machine vision field, and the field of professional video photography. The technology used to manufacture image sensors, and in particular, complementary-metal-oxide-semiconductor (CMOS) image sensors, has continued to advance at great pace. For example, the demand of higher frame rates and lower power consumption has encouraged the further miniaturization and integration of these image sensors.

In addition to the frame rate and power consumption demands, image sensors are also subjected to performance demands. The quality and accuracy of the pixel readouts cannot be compromised to accommodate the increase in frame rate or power consumption.

For example, current image sensors with column analog-to digital conversion (ADC) circuits read out multiple pixels (e.g., a row of pixels) at the same time. When a large number of these read out pixels receive similar brightness, the pixels may cause shift in the apparent comparator output values of the rest of the pixels. This shift appears as a horizontal smear or horizontal streak noise on the image readout which is referred to as Horizontal Banding (or H-banding). H-banding is one of the major performance issues in image sensors. H-banding is caused by the accumulated disturbance to environment signals (references, power/ground nets, etc.) from the readout of a subset of pixels, which then affect the accuracy of reading out other pixels that also share these signals.

Darker signals usually toggle earlier depending on the ADC design and brighter signals that toggle later can be affected. Comparators coupled to pixels of the similar brightness would toggle around the same time. The effect of a plurality of comparators toggling around the same time would have an accumulated effect on the other comparators, resulting in H-banding.

BRIEF DESCRIPTION OF THE DRAWINGS

The embodiments of the invention are illustrated by way of example and not by way of limitation in the figures of the accompanying drawings in which like references indicate similar elements throughout the various views unless otherwise specified. It should be noted that references to "an" or "one" embodiment of the invention in this disclosure are not necessarily to the same embodiment, and they mean at least one. In the drawings.

Figure 1:
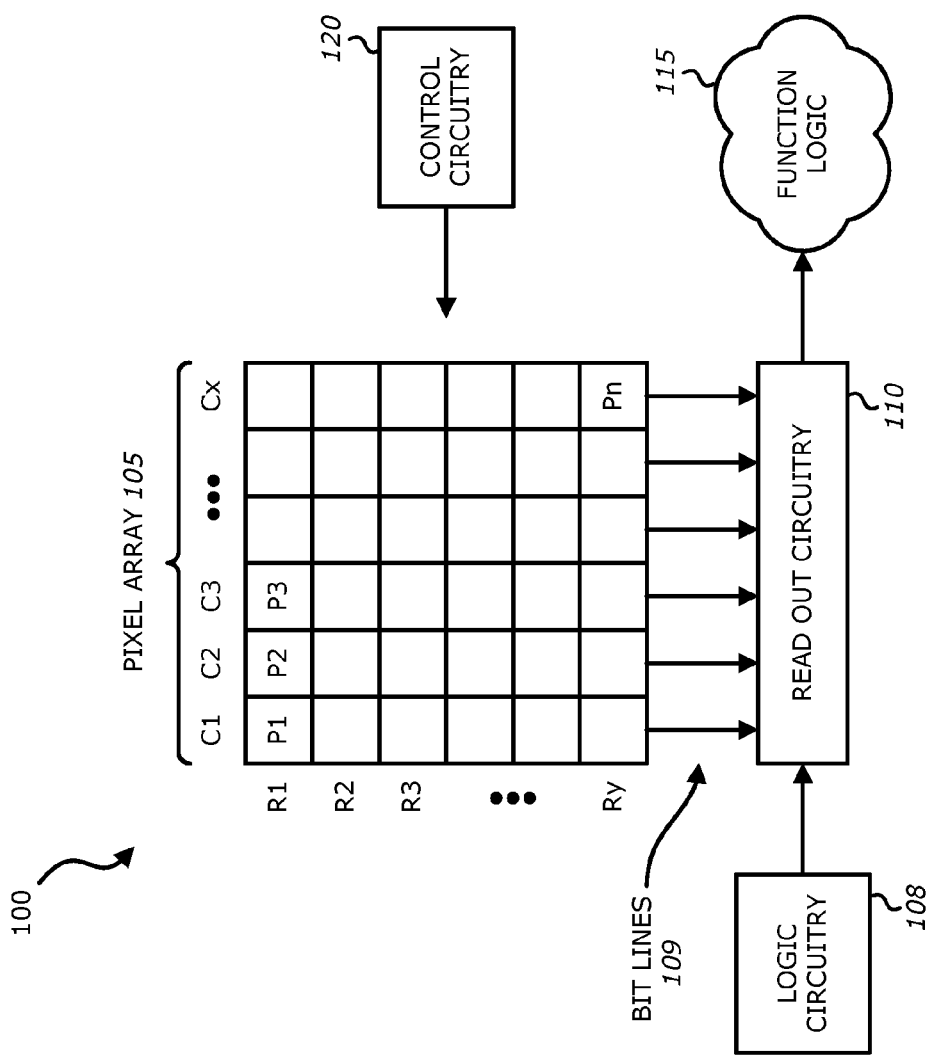
FIG. 1 is a block diagram illustrating an example imaging system that implements H-banding cancellation in accordance to one embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. However, it is understood that embodiments of the invention may be practiced without these specific details. In other instances, well-known circuits, structures, and techniques have not been shown to avoid obscuring the understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Particular features, structures or characteristics may be included in an integrated circuit, an electronic circuit, a combinatorial logic circuit, or other suitable components that provide the described functionality.

Examples in accordance with the teaching of the present invention describe an image sensor that implements H-banding cancellation in column analog-to-digital conversion (ADC) circuitry of the readout circuitry in image sensors. When a comparator output toggles, this generates noise on shared signals such as the ramp signal and power and ground supply lines. Comparators coupled to pixels of the similar brightness would toggle around the same time. The noise, coupled though capacitance, would accumulate and become more obvious. This invention will cancel the noise coupled through this capacitance and improve the performance of the image sensor.

FIG. 1 is a block diagram illustrating an example imaging system that implements H-banding cancellation in accordance to one embodiment of the invention. Imaging system 100 may be a complementary metal-oxide-semiconductor ("CMOS") image sensor. As shown in the depicted example, imaging system 100 includes pixel array 105 coupled to control circuitry 120 and readout circuitry 110, which is coupled to function logic 115 and logic control 108.

The illustrated embodiment of pixel array 105 is a two-dimensional ("2D") array of imaging sensors or pixel cells (e.g., pixel cells P1, P2, . . . , Pn). In one example, each pixel cell is a CMOS imaging pixel. Each pixel cell in pixel array 105 is arranged in a row (e.g., rows R1 to Ry) and a column (e.g., columns C1 to Cx) to acquire image data of a person, place or object, etc., which can then be used to render an image of the person, place or object, etc.

In one example, after each pixel has acquired its image data or image charge, the image data is read out by readout circuitry 110 through readout column bit lines 109 and then transferred to function logic 115. In various examples, readout circuitry 110 may include amplification circuitry (not illustrated), analog-to-digital conversion (ADC) circuitry 220, or otherwise. Function logic 115 may simply store the image data or even manipulate the image data by applying post image effects (e.g., crop, rotate, remove red eye, adjust brightness, adjust contrast, or otherwise). In one example, readout circuitry 110 may read out a row of image data at a time along readout column lines (illustrated) or may read out the image data using a variety of other techniques (not illustrated), such as a full parallel read out of all pixels simultaneously.

In one example, control circuitry 120 is coupled to pixel array 105 to control operational characteristics of pixel array 105. For example, control circuitry 120 may generate a shutter signal for controlling image acquisition. In one example, the shutter signal is a global shutter signal for simultaneously enabling all pixels within pixel array 105 to simultaneously capture their respective image data during a single acquisition window. In another example, the shutter signal is a rolling shutter signal such that each row, column, or group of pixels is sequentially enabled during consecutive acquisition windows. In one example, control circuitry 120 may include selection circuitry to readout a row or column of image data at a time along readout column bit lines 109 or may readout the image data using a variety of other techniques, such as a serial readout or a full parallel readout of all pixels simultaneously.

Figure 2:
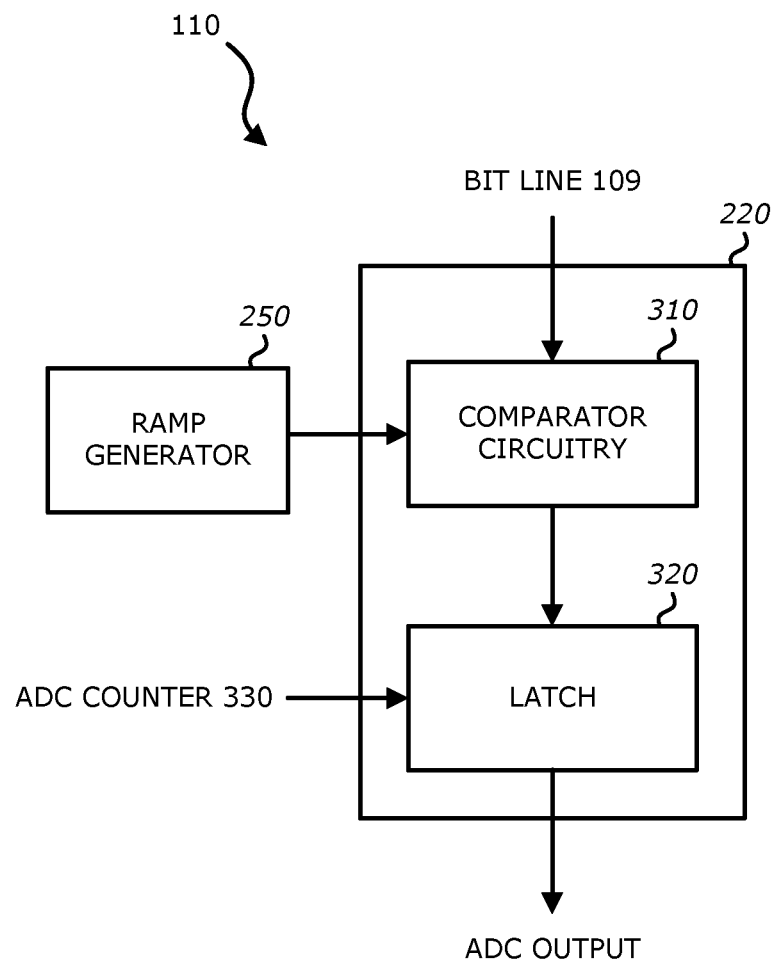
FIG. 2 is a block diagram illustrating the details of readout circuitry of imaging system in FIG. 1 that implements H-banding cancellation in accordance to one embodiment of the invention.

FIG. 2 is a block diagram illustrating the details of readout circuitry 110 of imaging system in FIG. 1 that implements H-banding cancellation in accordance to one embodiment of the invention. As shown in FIG. 2, the readout circuitry 110 may include an ADC circuitry 220 and ramp generator 250. While not illustrated, in some embodiments, a plurality of ADC circuitry 220 may be included in readout circuitry 110. ADC circuitry 220 may be a type of column ADC (e.g., SAR, cyclic, etc.). ADC circuitry 220 may be similar for each column of pixel array 105. ADC circuitry 220 may receive the pixel signal from pixel array 105 via bit lines 109 comprises a comparator circuitry 310 and a latch 320. Comparator circuitry 310 receives pixel data signals via bit line 109 and the ramp signal from ramp generator 250. Comparator circuitry 310 compares the pixel data signals to the ramp signal and generates comparator output signals. When the value of the ramp signal equals the analog input of ADC circuitry 220, a signal is outputted, and the current value of an ADC counter 330 is latched by latch 320. The latched value is a digital representation of the analog input of the ADC circuitry 220. In one embodiment, latch 320 may be omitted.

In one embodiment, ADC counter 330 may be an asynchronous counter, an arithmetic counter, etc. In another embodiment, ADC circuitry 220 may be a successive approximation register (SAR) ADC. In another embodiment, the ADC counter may include a local counter, in which case, each of the plurality of ADC circuitry in readout circuitry 110 has their own counter. The ADC counter may include a global counter, in which case, the plurality of ADC circuitry in readout circuitry 110 shares the same counter. The ADC output from comparator circuitry 310 may be readout to function logic 115. In one embodiment, function logic 115 receives and processes the ADC output to generate a final ADC output.

Figure 3:
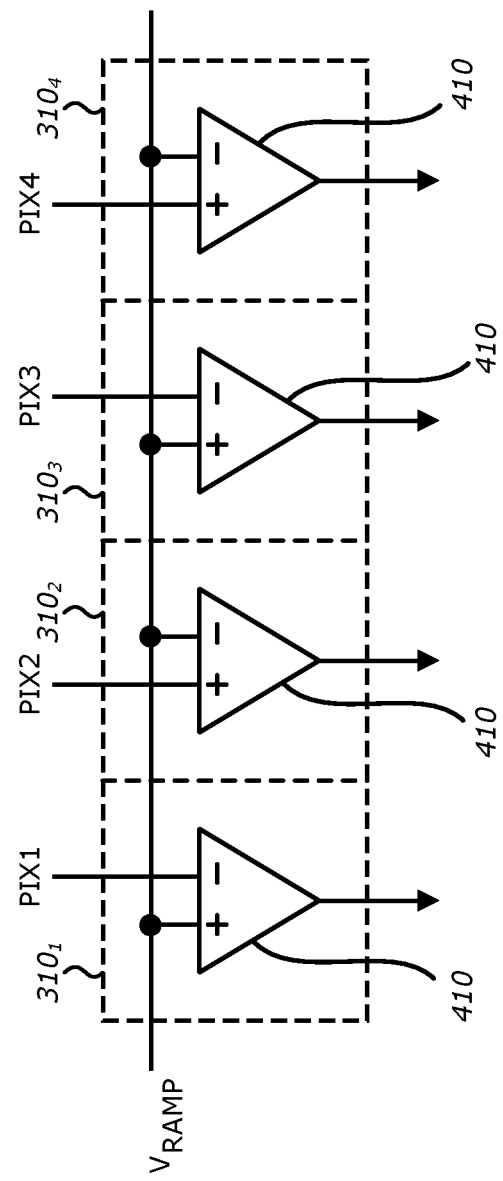
FIG. 3 is a block diagram illustrating the details of comparator circuitry in FIG. 2 in accordance to a first embodiment of the invention.
Figure 4:
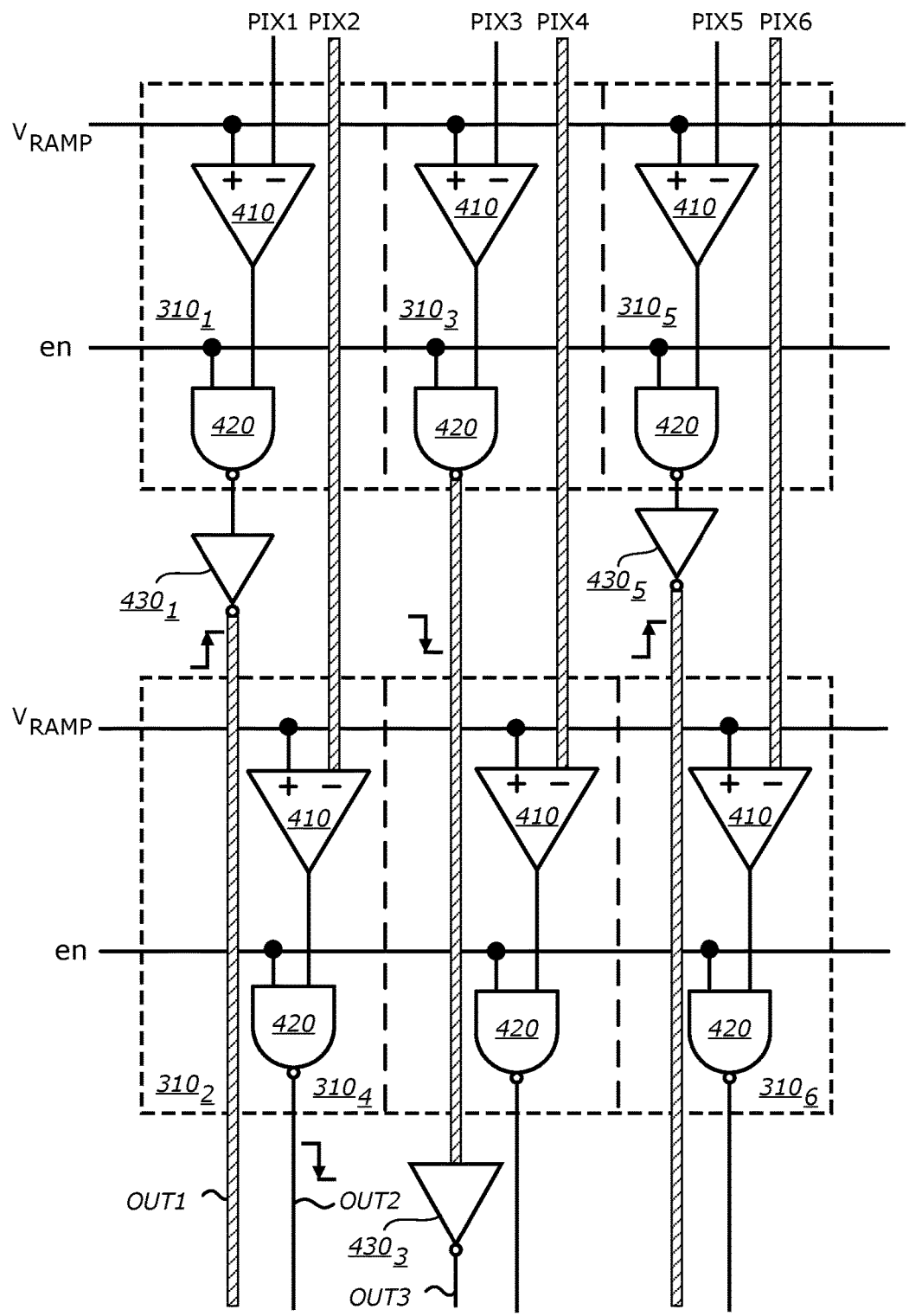
FIG. 4 is a block diagram illustrating the details of comparator circuitry in FIG. 2 in accordance to a second embodiment of the invention.

FIG. 3 is a block diagram illustrating the details of comparator circuitry 310 in FIG. 2 in accordance to a first embodiment of the invention. As shown in FIG. 3, in some embodiments, readout circuitry 110 of FIG. 1 includes a plurality of ADC circuitry 220 of FIG. 2 that is similar for each column of pixel array 105 of FIG. 1. FIG. 3 illustrates a plurality of comparator circuitry 310 included in the plurality of ADC circuitry 220, respectively. Each comparator circuitry 310 includes a comparator 410 such as a differential op amp. Each comparator 410 compares one of the pixel data signals (e.g., PIX1, PIX2, etc.) to a ramp signal ($V_{RAMP}$) and outputs a comparator output signal. As shown in FIG. 3, the comparator inputs of every second comparator 410 are swapped to reverse output polarity of the comparator output signal of every second comparator. As shown in FIG. 3, the pixel data signals PIX1 and PIX2 are respectively coupled to the negative (inverting) input and the positive (non-inverting) input of the comparators 410 included in comparator circuits $310_1$ and $310_2$. By coupling the comparator input signals PIX1 and PIX2 to the reverse inputs of the comparators 410, the output polarity of the comparator signals of every second comparator is thus reversed. In this embodiment, while comparator output coupling to environment signals still exists, the noise coupled though the capacitance among adjacent comparators 410 in FIG. 3 and shared references such as the power supply or ground lines is cancelled, and therefore their H-banding contributions are cancelled. This embodiment of the invention may be used if all comparator circuitry 310 of readout circuitry 110 of FIG. 1 is arranged in the same row. In FIG. 4, another embodiment of the invention will be shown where less than all of the comparator circuitry 310 of readout circuitry 110 of FIG. 1 is arranged in the same row, or in other words, some comparator circuitry 310 of readout circuitry 110 of FIG. 1 are arranged in another row.

Reversing the input polarity of some of comparators 410 in FIG. 3 may cause the amplitude of coupling from comparator 410's internal nodes to the environment to be different (e.g., kickback to $V_{RAMP}$), resulting in imperfect cancellation of their H-banding contributions. In some embodiments, to address the different amplitude of this coupling, the ramp signal from ramp generator 250 may be received and buffered by a ramp buffer or, in another embodiment; the first stage comparator 410 is fully differential. Further, reversing the input polarity of some of comparators 410 may also cause the comparator gain and delay characteristics to be different (resulting in Vertical Fixed-Pattern Noise (VFPN)). In some embodiments, to address these differences, ADC circuitry 220 may implement digital correlated double sampling (CDS) or randomly swap pixel inputs in a pair of comparators 410.

The use of color filters means that comparators coupled to adjacent pixel data signals may not toggle at the same time, so it may not be necessary to reverse the output polarity of every second comparator. Accordingly, in other embodiments, the comparator inputs of every group of two comparators 410 are swapped to reverse the output polarity of comparator signal of every group of two comparators. For example, pixel data signals PIX1 and PIX2 may be connected to the inverting (negative) input of the comparators 410 in comparator circuits $310_1$ and $310_2$ respectively, while pixel data signals PIX3 and PIX4 may be connected to the non-inverting (positive) input of the comparators 410 in comparator circuits $310_3$ and $310_4$, respectively. In other embodiments, the comparator inputs of every group of n comparators 410 are swapped to reverse the output polarity of comparator signal of every group of n comparators, where n is an integer greater than 1. For example, a first group of three comparators 410 included in comparator circuits $310_1$-$310_3$ may receive the pixel data signals PIX1, PIX2, PIX3 at the positive inputs and a second group of three comparators 410 included in comparator circuits $310_4$-$310_6$ may receive the pixel data signals PIX4, PIX5, PIX6 at the negative inputs.

FIG. 4 is a hybrid block-layout diagram, which illustrates the layout of comparator circuitry 310 on the semiconductor substrate as well as the location of some of the physical metal interconnect, or line of this circuitry in accordance to a second embodiment of the invention. In the illustrated embodiment, each comparator circuitry 310 includes differential comparator 410 and NAND gate 420. As seen in FIG. 4, the array of comparators are arranged in two rows with comparators coupled to odd columns of pixel array 105 from FIG. 1 arranged in a top row, and comparators coupled to even columns of pixel array 105 arranged in a bottom row.

FIG. 4 illustrates a plurality of comparator circuitry 310 included in the plurality of ADC circuitry 220, respectively. Each comparator circuitry 310 includes a comparator 410 such as a differential op amp. Each comparator 410 compares one of the pixel data signals (e.g., PIX1, PIX2, etc.) to a ramp signal ($V_{RAMP}$) and outputs a comparator output signal. There are many reasons why comparators are arranged this way, one is to increase the width each comparator circuitry 410 on the silicon substrate. By having stacked comparators, these exists the problem of H-banding caused by coupling between the top comparator outputs and the bottom comparators In contrast to FIG. 3, the embodiment in FIG. 4 illustrates that comparators 410 are stacked to obtain a plurality of comparators arranged in the top row, or "top comparators" (e.g., comparators 410 receiving pixel data signals from odd numbered columns in pixel array 105) and a plurality of comparators arranged in a bottom row, or "bottom comparators" (e.g., comparators 410 receiving pixel data signals from even numbered columns in pixel array 105). In the illustrated example, all comparator circuitry 310 have the same configuration, ramp signal $V_{RAMP}$ is coupled to the non-inverting input of comparator 410, while pixel data signal is coupled to the inverting input of comparator 410. When the value of the ramp signal, $V_{RAMP}$ equals the pixel data signal, for example PIX1, a signal is output from comparator 410, and the current value of an ADC counter is latched by a latch. The output of comparator 410 is coupled to one input of NAND gate 420, the other input of NAND gate 420 is coupled to an enable signal en.

In addition to showing the layout of comparator circuitry 310 on the semiconductor substrate, FIG. 4 also shows the location of some of the lines of this circuitry. For example, the shaded line indicates the physical location in which this metal interconnect transverses. As seen in FIG. 4, the metal interconnect, or lines which carries adjacent top comparator output signal, such as the shaded line which represents the output of comparator circuitry $310_1$ and $310_3$, transverse or across the bottom comparators, comparator circuitry $310_2$ and $310_4$ have different polarities. This is achieved by inverting the output of comparator circuitry $310_1$ and placing inverter 4301 between the top and bottom comparators so that the inverted output of comparator circuitry $310_1$ crosses the bottom comparator. The output of adjacent top comparator $310_3$ is not inverted until after it crosses the bottom comparator circuitry $310_4$, so that the lines which carry adjacent top comparator output signals across the bottom comparators have different polarities. In other words, inverter $430_3$ is not placed between the top and bottom comparators, but is placed below the bottom comparators. By doing this, the noise coupled through the capacitance which occurs between the output of the top comparator circuitry and ramp signal $V_{RAMP}$ and other shared references such as the power supply or ground lines of the bottom comparators can be cancelled. In the illustrated example, inverters are connected to the output of every top comparator so that the output of these comparators can all have the same polarities. In the illustrated examples, the output of the bottom comparators is not connected to an inverter, so the polarities of the output of the top and bottom comparators are not the same. In other embodiments, the output of the bottom comparators may be connected to an inventor to keep the polarities of the output of all the comparator circuitry 310 of the readout circuit the same. In other examples, inverters connected to the output of every other top comparator, such as inverter $430_3$ connected to the output of comparator circuitry $310_3$, may be omitted.

In the illustrated embodiment, the output of every second top comparator circuitry 310 is inverted before it crosses its associated bottom comparator circuitry. In other embodiments, the output of every group of two comparator circuitry 310 is inverted before it crosses its associated bottom comparator circuitry. The use of color filters means that comparators coupled to adjacent pixel data signals may not toggle at the same time, so it may not be necessary to reverse the output polarity of every second comparator circuitry. For example, the output of comparator circuitry $310_1$ and $310_3$ may be inverted before it crosses its associated bottom comparator circuitry, while the output of comparator circuitry $310_5$ and $310_7$ (not shown) may be inverted after it crosses its associated bottom comparator circuitry. In other embodiments the output of every group of n comparator circuitry is inverted before it crosses its associated bottom comparator circuitry, where n is an integer greater than 1.

Figures 5A, 5B:
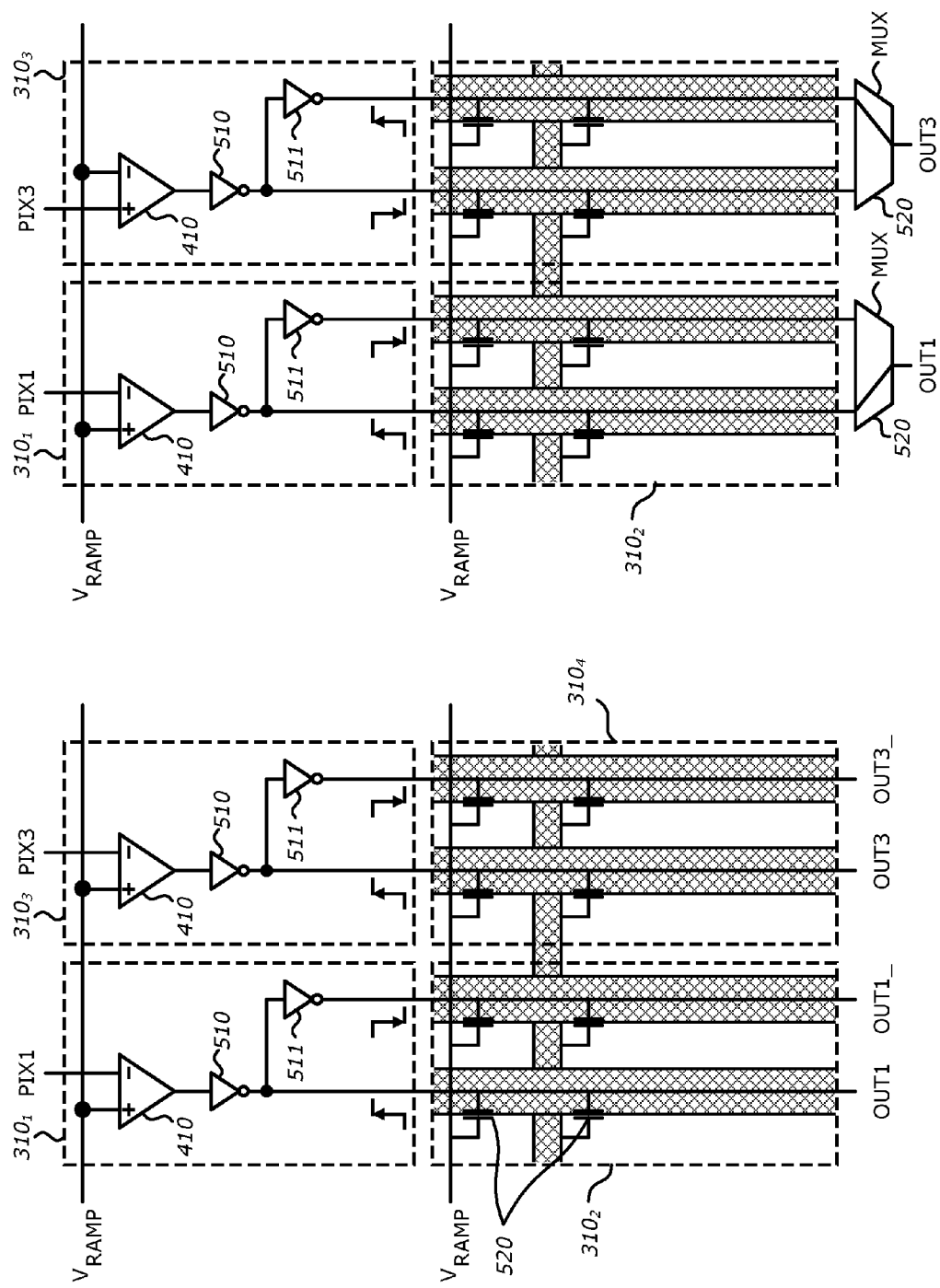
FIGS. 5A-5B are block diagrams illustrating the details of comparator circuitry in FIG. 2 in accordance to a third and a fourth embodiment of the invention.

FIGS. 5A-5B are block diagrams illustrating the details of comparator circuitry 310 in FIG. 2 in accordance to a third and a fourth embodiment of the invention. Similar to FIG. 3, in FIGS. 5A-5B, readout circuitry 110 includes a plurality of ADC circuitry 220 that is similar for each column of pixel array 105. FIGS. 5A-5B illustrate a plurality of comparator circuitry 310 included in the plurality of ADC circuitry 220, respectively. Each comparator circuitry 310 includes a comparator 410. As seen in FIGS. 5A and 5B, the array of comparator are stacked to obtain a plurality of comparators arranged in the top row, or "top comparators", such as comparator circuitry $310_1$ which receives pixel data signal PIX1 and a plurality of comparators arranged in a bottom row, or "bottom comparators", such as comparator circuitry $310_2$, which receives pixel data signal PIX2. Similar to FIG. 4, the embodiment in FIGS. 5A-5B illustrate that comparators 410 are stacked to obtain a plurality of top comparators (e.g., comparators 410 receiving pixel data signals from odd numbered columns in pixel array 105) and a plurality of bottom comparators (e.g., comparators 410 receiving pixel data signals from even numbered columns in pixel array 105). Each comparator 410 compares one of the pixel data signals (e.g., PIX1, PIX2, etc.) to a ramp signal ($V_{RAMP}$) and outputs a comparator output signal.

In FIG. 5A, for each comparator 410 of comparator circuitry 310, ramp signal $V_{RAMP}$ is coupled to the non-inverting input of comparator 410, while pixel data signal PIXn is coupled to the inverting input of comparator 410. In contrast to FIG. 4, each comparator circuitry 310 in FIG. 5A outputs both positive and negative signals. As shown in FIG. 5A, the output of comparators 410 are coupled to a NOT gates 510 and 511 (or inverters) to generate a positive comparator output signal and a negative comparator output signal. By doing this, the noise coupled through the capacitance which occurs between the outputs of the top comparator circuitry and the ramp signal $V_{RAMP}$ coupled to the bottom comparators as well as the noise coupled through the capacitance which occurs between the outputs of the top comparators and other shared references of the bottom comparators such as the power supply or ground lines can be cancelled. This capacitance is illustrated in FIG. 5A by the capacitor 520. Comparator circuitry $310_1$, for example, as shown in FIG. 5A is capable of cancelling its own noise, and does not require adjacent comparator, such as comparator circuitry $310_3$ to cancel their H-banding contribution. The details of bottom comparator circuitry $310_2$ and $310_4$ are not shown, and in one example bottom comparator circuitry $310_2$ and $310_4$ may comprise the same elements of top comparator circuitry $310_1$ and $310_3$. In other examples, inverter 510 may be omitted.

In FIG. 5B, comparator circuitry 310 has a slightly different arrangement. Note that the inputs of comparator 410 alternate in terms of their connections. For example, the ramp signal $V_{RAMP}$ is coupled to the non-inverting input of comparator 410 of comparator circuitry $310_1$, while the ramp signal $V_{RAMP}$ is coupled to the inverting input of comparator 410 of comparator circuitry $310_3$. Each multiplexer 520 in FIG. 5B receives the two comparator output signals (e.g., positive and negative comparator output signal) from each of comparators 410, respectively, and outputs one of the two comparator output signals as a multiplexer output, respectively. Similar to the comparator circuitry in FIG. 5A, comparator circuitry 310 of FIG. 5B can cancel the noise coupled through the capacitance which occurs between the outputs of the top comparator circuitry and the ramp signal $V_{RAMP}$ coupled to the bottom comparators as well as the noise coupled through the capacitance which occurs between the outputs of the top comparators and other shared references of the bottom comparators such as the power supply or ground lines. While each comparator's noise coupling to environment signals is mostly cancelled between its positive and negative outputs, some noise still remains and will contribute to H-banding. In this embodiment, the noise coupled though the capacitance among adjacent top comparators 410, for example, the inverted top comparator 410 output of comparator circuitry $310_1$ and $310_3$, and the ramp signal $V_{RAMP}$ coupled to the bottom comparators and among the capacitance among adjacent top comparators 410 and shared references such as the power supply or ground lines is cancelled, and therefore their H-banding contributions are cancelled. The details of bottom comparator circuitry $310_2$ and $310_4$ are not shown, and in one example may comprise the same elements of top comparator circuitry $310_1$ and $310_3$. In other examples, inverters 510 and 511 may be omitted.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 6:
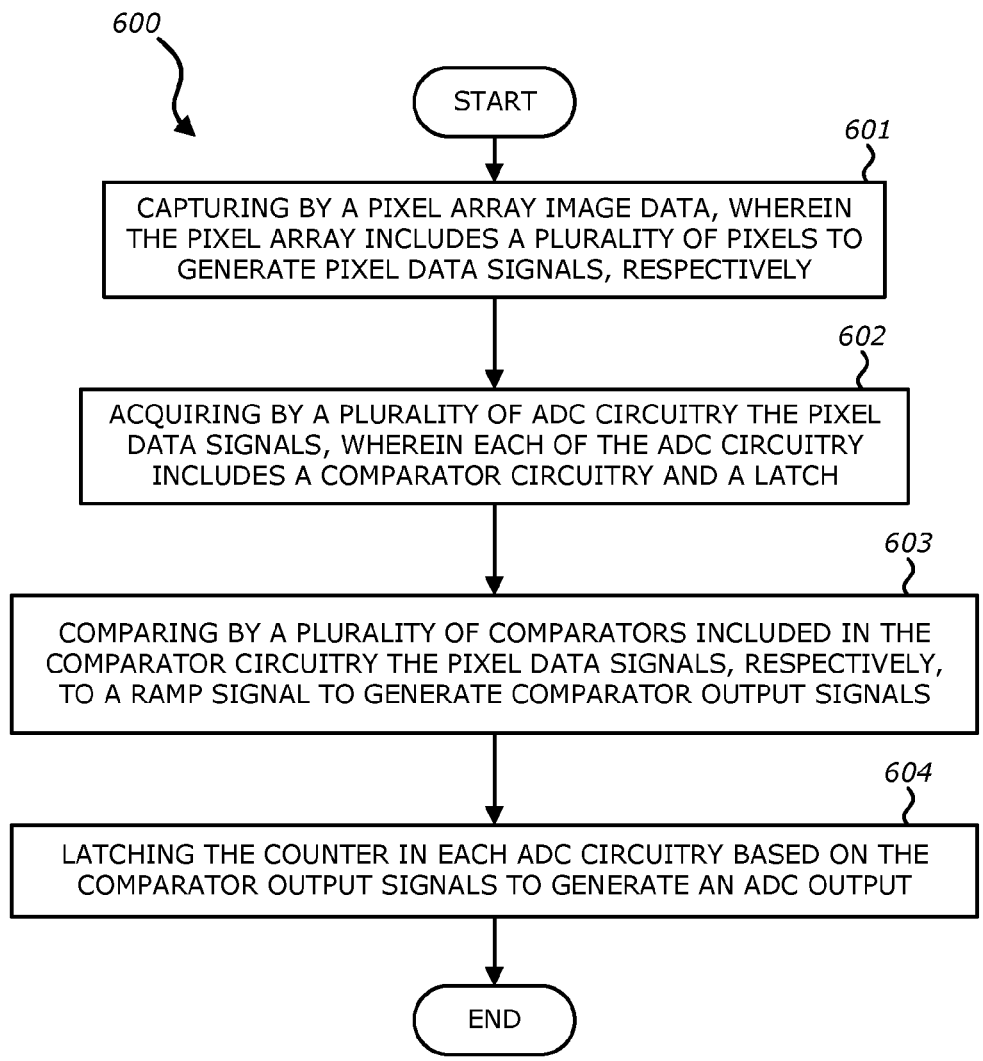
FIG. 6 is a flowchart illustrating a method of implementing H-banding cancellation in accordance to one embodiment of the invention.

FIG. 6 is a flowchart illustrating a method 600 of implementing H-banding cancellation in accordance to one embodiment of the invention. Method 600 starts with a pixel array 105 capturing image data at Block 801. Pixel array 105 includes a plurality of pixels to generate pixel data signals, respectively. At Block 602, a plurality of ADC circuitry 220 acquires the pixel data signals. Each ADC circuitry 220 may include a comparator circuitry 310 and a latch 320. In one embodiment, comparator circuitry 310 includes a plurality of comparators. At Block 603, a plurality of comparators included in comparator circuitry 310 compare the pixel data signals, respectively, to a ramp signal received from a ramp generator 250 to generate comparator output signals. At Block 604, latch 320 latches the counter in each ADC circuitry based on the comparator output signals to generate an ADC output.

In one embodiment, adjacent comparators output signals are opposite in polarity. The comparator inputs of every second comparator in comparator circuitry 310 may be swapped to reverse output polarity of the comparator output signal of every second comparator. In one embodiment, the plurality of comparators are stacked to obtain a plurality of top comparators and a plurality of bottom comparators. In one embodiment, the lines which carry the top comparator output signals that cross the bottom comparators have different polarities from the top comparators.

In another embodiment, the plurality of comparators are stacked and each of the plurality of comparators are coupled to a plurality of inverters to generate two comparator output signals. The two comparator output signals include a positive comparator output signal and a negative comparator output signal. In this embodiment, comparator circuitry further includes a plurality of multiplexer that receive the two comparator output signals from each of the comparators, respectively. Each multiplexer may then output one of the two comparator output signals as a multiplexer output. The multiplexer outputs of adjacent multiplexers may be opposite in polarity.

The processes explained above are described in terms of computer software and hardware. The techniques described may constitute machine-executable instructions embodied within a machine (e.g., computer) readable storage medium, that when executed by a machine will cause the machine to perform the operations described.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor comprising:
a pixel array for acquiring image data of a frame, wherein the pixel array includes a plurality of pixels to generate pixel data signals, respectively;
readout circuitry coupled to the pixel array, wherein the readout circuitry includes:
a ramp generator to generate a ramp signal, and
an analog-to-digital conversion (ADC) circuitry that converts the pixel data signals from analog to digital to obtain ADC outputs, wherein the ADC circuitry includes:
comparator circuitry that includes a plurality of comparators, each of the comparators compares one of the pixel data signals to a ramp signal and outputs a comparator output signal, wherein adjacent comparators output signals are opposite in polarity, and wherein the plurality of comparators are arranged in a stack to form a plurality of top comparators disposed on a plurailty of bottom comparators; and
logic circuitry coupled to control the readout circuitry.

2. The image sensor of claim 1, wherein the ADC circuitry includes a latch to latch an ADC counter based on the comparator output signals from the plurality of comparators to generate an ADC output.

3. The image sensor of claim 1, wherein comparator inputs of every second comparator in the comparator circuitry are swapped to reverse output polarity of the comparator output signal of every second comparator.

4. The image sensor of claim 1, wherein comparator inputs of every group of n comparator in the comparator circuitry are swapped to reverse output polarity of the comparator output signal of every group of n comparator.

5. The image sensor of claim 1, wherein the top comparators output a top comparator output signal and the bottom comparators output a bottom comparator output signal, wherein lines carry the top comparator output signal that cross the bottom comparators to have different polarities from the top comparators.

6. The image sensor of claim 1, wherein the ADC counter includes an arithmetic counter or an asynchronous counter.

7. The image sensor of claim 1, wherein the logic circuitry further includes an ADC clock generator to generate an ADC clock, wherein the ramp generator generates the ramp signal that is synchronized to the ADC clock.

8. An image sensor comprising:
a pixel array for acquiring image data, wherein the pixel array includes a plurality of pixels to generate pixel data signals, respectively;
readout circuitry coupled to the pixel array, wherein the readout circuitry includes:
a ramp generator to generate a ramp signal, and
an analog-to-digital conversion (ADC) circuitry that converts the pixel data signals from analog to digital to obtain ADC outputs, wherein the ADC circuitry includes:
comparator circuitry that includes a plurality of comparators, each of the comparators compares one of the pixel data signals to a ramp signal and outputs a comparator output signal, wherein the plurality of comparators are stacked to form a plurality of top comparators disposed on a plurality of bottom comparators, wherein each of the plurality of comparators are coupled to a plurality of inverters to generate two comparator output signals, the two comparator output signals include a positive comparator output signal and a negative comparator output signal, and
logic circuitry to control the readout circuitry.

9. The image sensor of claim 8, wherein the comparator circuitry further includes a plurality of multiplexers, wherein each multiplexer receives the two comparator output signals from each of the comparators, respectively, and outputs one of the two comparator output signals as a multiplexer output, respectively.

10. The image sensor of claim 9, wherein multiplexer outputs of adjacent multiplexers are opposite in polarity.

11. The image sensor of claim 8, wherein the ADC circuitry includes a latch to latch an ADC counter based on the comparator output signals from the plurality of comparators to generate an ADC output.

12. The image sensor of claim 8, wherein the ADC counter includes an arithmetic counter or an asynchronous counter.

13. The image sensor of claim 8, wherein comparator inputs of every second comparator in the comparator circuitry are swapped to reverse output polarity of the comparator output signal of every second comparator.

14. The image sensor of claim 8, wherein comparator inputs of every group of n comparator in the comparator circuitry are swapped to reverse output polarity of the comparator output signal of every group of n comparator.

15. The image sensor of claim 8, wherein the logic circuitry further includes an ADC clock generator to generate an ADC clock, wherein the ramp generator generates the ramp signal that is synchronized to the ADC clock.

16. A method of implementing H-banding cancellation in an image sensor comprising:
capturing, by a pixel array, image data, wherein the pixel array includes a plurality of pixels to generate pixel data signals, respectively;
acquiring, by ADC circuitry coupled to the pixel array, the pixel data signals, wherein the ADC circuitry includes comparator circuitry and a latch;
comparing, by a plurality of comparators included in the comparator circuitry, the pixel data signals, respectively, to a ramp signal received from a ramp generator to generate comparator output signals, wherein adjacent comparators output signals are opposite in polarity, wherein the plurality of comparators are arranged in a stack to form a plurality of top comparators disposed on a plurality of bottom comparators; and
latching, by the latch, an ADC counter based on the comparator output signals to generate an ADC output.

17. The method of claim 16, wherein comparator inputs of every second comparator in the comparator circuitry are swapped to reverse output polarity of the comparator output signal of every second comparator.

18. The method of claim 16, wherein lines that cross the bottom comparators to have different polarities from the top comparators.

19. A method of implementing H-banding cancellation in an image sensor comprising:
capturing, by a pixel array, image data, wherein the pixel array includes a plurality of pixels to generate pixel data signals, respectively;
acquiring, by ADC circuitry coupled to the pixel array, the pixel data signals, wherein the ADC circuitry includes comparator circuitry and a latch;

comparing, by a plurality of comparators included in the comparator circuitry, the pixel data signals, respectively, to a ramp signal received from a ramp generator to generate comparator output signals, wherein the plurality of comparators are stacked, wherein each of the plurality of comparators are coupled to a plurality of inverters to generate two comparator output signals, the two comparator output signals include a positive comparator output signal and a negative comparator output signal;

latching by a latch an ADC counter based on the comparator output signals to generate an ADC output;

receiving, by each multiplexer, the two comparator output sinals from each of the comparators, respectively; and providing, by each multiplexer, one of the two comparator output signals as a multiplexer output, respectively.

20. The method of claim 19, wherein multiplexer outputs of adjacent multiplexers are opposite in polarity.

* * * * *